United States Patent
Traversat et al.

(12) 
(10) Patent No.: US 6,351,751 B1
(45) Date of Patent: Feb. 26, 2002

(54) PERSISTENT STORAGE MANAGERS FOR CONFIGURING CLIENT/SERVER ENVIRONMENTS

(75) Inventors: Bernard A. Traversat, San Francisco; Jeffrey A. Schmidt, Boulder Creek; Thomas Saulpaugh, San Jose, all of CA (US); Steve Woodward, Boca Raton, FL (US); William J. Tracey, Round Rock, TX (US)

(73) Assignees: Sun Microsystems, Inc., Palo Alto, CA (US); International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/079,042

(22) Filed: May 14, 1998

(51) Int. Cl.$^7$ ............................................. G06F 17/00

(52) U.S. Cl. ............................... 707/103 Y; 709/220

(58) Field of Search .............................. 709/303, 301, 709/220, 219; 713/2; 395/500.34; 707/103; 710/3

(56) References Cited

U.S. PATENT DOCUMENTS

| | | | | |
|---|---|---|---|---|
| 5,247,669 A | * | 9/1993 | Abraham et al. | 707/103 |
| 5,297,279 A | * | 3/1994 | Bannon et al. | 707/103 |
| 5,437,027 A | * | 7/1995 | Bannon et al. | 707/103 |
| 5,564,054 A | * | 10/1996 | Bramnick et al. | 713/2 |
| 5,590,334 A | * | 12/1996 | Saulpaugh et al. | 709/303 |
| 5,734,903 A | * | 3/1998 | Saulpaugh et al. | 709/303 |
| 5,802,365 A | * | 9/1998 | Kathail et al. | 709/301 |
| 5,944,781 A | * | 8/1999 | Murray | 709/202 |
| 5,968,136 A | * | 10/1999 | Saulpaugh et al. | 710/3 |
| 5,987,242 A | * | 11/1999 | Bentley et al. | 395/500.34 |
| 6,026,437 A | * | 2/2000 | Muschett et al. | 709/219 |
| 6,052,720 A | * | 4/2000 | Traversat et al. | 709/220 |
| 6,052,739 A | * | 4/2000 | Bopardikar et al. | 709/301 |
| 6,119,157 A | * | 9/2000 | Traversat et al. | 709/220 |
| 6,161,125 A | * | 12/2000 | Traversat et al. | 709/203 |
| 6,233,582 B1 | * | 5/2001 | Traversat et al. | 707/102 |

FOREIGN PATENT DOCUMENTS

| | | |
|---|---|---|
| WO | WO 97/49023 | 12/1997 |
| WO | WO 98/31124 | 7/1998 |

OTHER PUBLICATIONS

Taylor, P., "Designing Persistent Object–Oriented Software Architectures," Technology of Object–Oriented Languages, 1998. Tools 28, p. 14–26.*

Tripathi et al., "Management of persistent objects in the Nexus distributed system," Object Orientation in Operating Systems, 1992, pp. 100–104.*

Oueichek et al., "Using Persistent Objects for Configuration Management in Distributed Systems," Systems Management, 1996, IEEE, p. 1–8.*

Millard et al., "Run–time Support and Storage Management for Memory–Mapped Persistent Objects," Distributed Computing Systems, 1993, Proceedings the 13th International Conf., p. 508–515.*

(List continued on next page.)

*Primary Examiner*—Thomas Black
*Assistant Examiner*—Charles L. Rones
(74) *Attorney, Agent, or Firm*—Beyer Weaver & Thomas, LLP (57) ABSTRACT

Innovative managers of persistent data are provided. As an example, in a client/server environment, a persistent manager object may be initialized on both the client and server subsystems. The persistent manager objects may be instances of the same persistent manager class. The persistent manager object on the client subsystem may receive a request to store persistent data and the persistent manager object on the client sends the request to the persistent manager object on the server subsystem. The persistent manager object on the server subsystem may then store the persistent data to make it subsequently be available for the client subsystem.

19 Claims, 8 Drawing Sheets

OTHER PUBLICATIONS

Traversat et al. "A Machine–Independent Approach to Parallel Programming,", Databases, Parallel Architectures and Their Applications, PARBASE–90, International Conference on, 1990, p. 400–407.*

Uehara et al., "A Framework of Customizing Transactions in Persistent Object Management for Advanced Applications," Object–Orientation in Operating Systems, 1995., Fourth, Intl Conf. pp. 84–93.*

Wang et al., "Parallel R–tree Search Algorithm on DSVM," Database Systems for Advanced Applications, 1999, Proceedings, 6th Int'Conf., p. 237–244.*

Yu et al., "Transaction Management for a Distributed Object Storage System Wakashi–Design, Implementation and Performance," Data Engineering, 1996, pp. 460–468.*

* cited by examiner

PERSISTENT STORAGE MANAGERS FOR CONFIGURING CLIENT/SERVER ENVIRONMENTS

CROSS-REFERENCE TO RELATED APPLICATIONS

This application is related to U.S. Pat. No. 6,161,125, filed on May 14, 1998, issued on Dec. 12, 2000, entitled "GENERIC SCHEMA FOR STORING CONFIGURATION INFORMATION ON A CLIENT COMPUTER;" U.S. patent application Ser. No. 09/079,102, filed on May 14, 1998, entitled "METHOD AND APPARATUS FOR A CORE APPLICATION PROGRAMMING INTERFACE;" U.S. Pat. No. 6,233,582, filed on May 14, 1998, issued on May 15, 2001, entitled "PERSISTENT STORAGE INTERFACE FOR A CONFIGURATION OBJECT-BASED SYSTEM;" U.S. Pat. No. 6,119,157, filed on May 14,1998, issued Sep. 12, 2000, entitled "PROTOCOL FOR EXCHANGING CONFIGURATION DATA IN A COMPUTER NETWORK;" U.S. Pat. No. 6,052,720, filed on May 14, 1998, issued on Apr. 18, 2000, entitled "GENERIC SCHEMA FOR STORING CONFIGURATION INFORMATION ON A SERVER COMPUTER;" and U.S. Provisional Application No. 60/085, 425, filed on May 14, 1998, entitled "JAVA SYSTEM DATABASE," which are all incorporated herein by reference.

BACKGROUND OF THE INVENTION

The present invention relates to persistent storage managers. More specifically, the invention relates to persistent storage managers for client/server environments.

The processing power of personal computers is increasing at an amazing rate. For example, it has been estimated that today's personal computers have more processing power than the computers that were first utilized to put men on the moon. Of course, with the increase in processing power, personal computers have also become quite complex.

One area where the complexities of personal computers has created a wealth of problems is the installation, maintenance (including removal) and upgrading of software applications and hardware. As administrators spend more and more of their time installing, maintaining and upgrading personal computers, they have less and less time to work on servers, networks, plan for the future, and the like.

One solution to the rising complexities of personal computers is to simplify the personal computer. For example, a "network computer" is generally a simplified personal computer that may sacrifice a little processing power to achieve a simplified platform. A network computer may include a processor that performs most processing functions, a read-only memory ("ROM") that stores bootup information and random access memory ("RAM") to store data while the network computer is operating. Persistent non-volatile mass storage, such as a local hard drive, and other complex hardware (e.g., graphics cards) are typically conspicuously absent in a network computer.

In operation, a network computer may interrogate the hardware at bootup to determine the hardware that is available. Additionally, the network computer may download software applications from a server computer over a network. Since the network computer typically has a simpler hardware configuration than traditional personal computers, it is easier for developers to develop software applications. Additionally, since software applications are downloaded at startup, software applications can be upgraded and maintained once, at the server computer, instead of multiple times for each individual personal computer.

Although network computers may include ROM, they may not have non-volatile storage for writing, such as a hard drive. Data that is stored in non-volatile storage is also called persistent data because it "persists" even after the computer is turned off (or crashes). Accordingly, it would be desirable to have innovative managers of persistent data in client/server environments.

SUMMARY OF THE INVENTION

In general, embodiments of the present invention provide innovative managers of persistent data. As an example, in a client/server environment, a persistent manager object may be initialized on both the client and server subsystems. The persistent manager objects may be instances of the same persistent manager class. The persistent manager object on the client subsystem may receive a request to store persistent data and the persistent manager object on the client sends the request to the persistent manager object on the server subsystem. The persistent manager object on the server subsystem may then store the persistent data to make it subsequently available for the client subsystem. Several embodiments of the invention are described below.

In one embodiment, a method for managing persistent data in a client/server environment includes instantiating a first persistent manager object on a client subsystem, where the first persistent manager object is an instance of a persistent manager class. The first persistent manager object on the client subsystem receives a request regarding persistent data and sends the request to a second persistent manager object on a server subsystem, where the second persistent manager object being is an instance of the same persistent manager class. The second persistent manager object then fulfills the request on the server subsystem. The request may be to store, retrieve or delete persistent data.

In another embodiment, method for initializing a client subsystem includes instantiating a first persistent manager object on a client subsystem, the first persistent manager object being an instance of a persistent manager class. The first persistent manager object on the client subsystem sends a request for initialization data to a second persistent manager object on a server subsystem, the second persistent manager object being an instance of the same persistent manager class. The second persistent manager object fulfills the request on the server subsystem by retrieving the initialization data from a persistent storage. In preferred embodiments, initialization data stored on the client subsystem is coalesced with the initialization data from the persistent storage.

Other features and advantages of the invention will become readily apparent upon review of the following detailed description in association with the accompanying drawings. In the drawings, the same reference numerals will be used to indicate similar structure.

BRIEF DESCRIPTION OF THE DRAWINGS

FIG. 9 shows a hierarchy of entries that are coalesced during bootup or user log in.

DETAILED DESCRIPTION OF PREFERRED EMBODIMENTS

Overview

In the description that follows, the present invention will be described in reference to preferred embodiments that are directed to network computers in a client/server environment. However, the invention is not limited to any particular computer architecture, network configuration, language, or specific implementation. For example, the invention may be advantageously applied to small hand-held devices, conventional personal computers, workstations, and the like. Therefore, the description of the embodiments that follow is for purposes of illustration and not limitation.

In general, a client/server environment includes a client that requests services of a server, which typically has shared resources. Although the client and server may be distinct computer systems connected over a network, this is not required. The client and server may reside on the same computer system. Accordingly, the terms "client" (and client subsystem) and "server" (and server subsystem) do not imply that there are distinct computer systems, although this may be the case.

Figure 1:
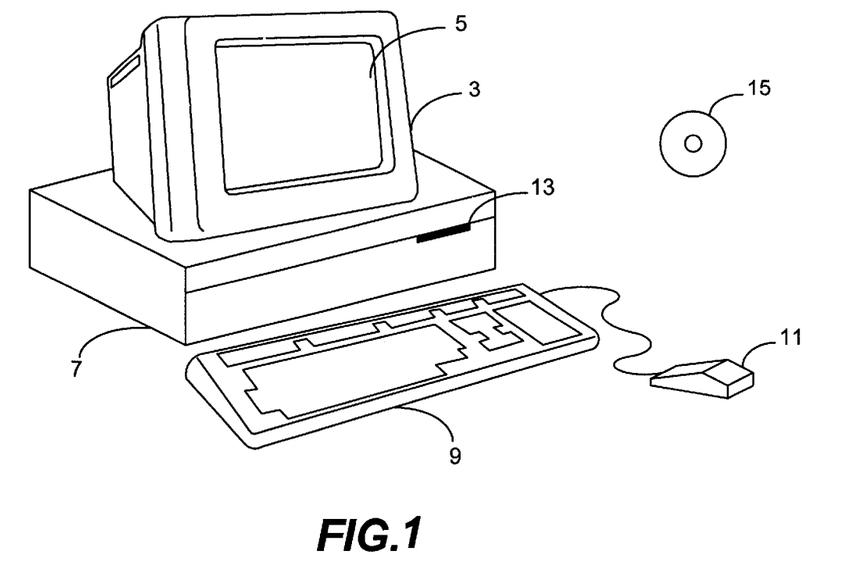
FIG. 1 illustrates an example of a computer system that may be utilized to execute the software of an embodiment of the invention.

FIG. 1 illustrates an example of a computer system that may be used to execute the software of an embodiment of the invention. FIG. 1 shows a computer system 1 that includes a display 3, screen 5, cabinet 7, keyboard 9, and mouse 11. Mouse 11 may have one or more buttons for interacting with a graphical user interface. Cabinet 7 houses a CD-ROM drive 13, system memory and a hard drive (see FIG. 2A) which may be utilized to store and retrieve software programs incorporating computer code that implements the invention, data for use with the invention, and the like. Although the CD-ROM 15 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium.

Figure 2A:
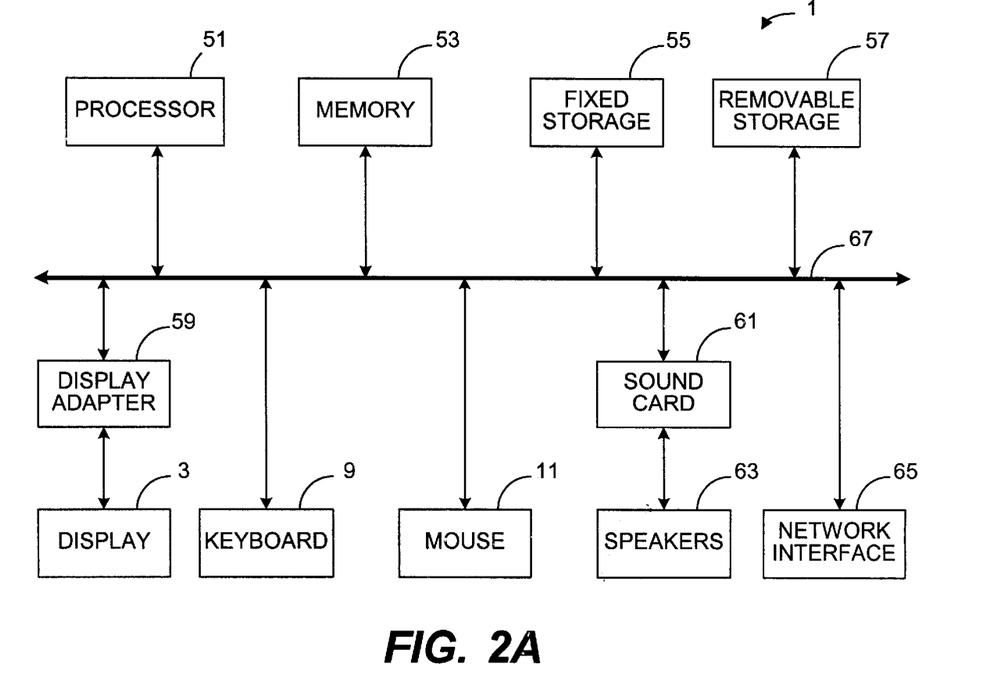
FIG. 2A shows a system block diagram of the computer system of FIG. 1

FIG. 2A shows a system block diagram of computer system 1 used to execute the software of an embodiment of the invention. As in FIG. 1, computer system 1 includes monitor 3, keyboard 9 and mouse 11. Computer system 1 further includes subsystems such as a central processor 51, system memory 53, fixed storage 55 (e.g., hard drive), removable storage 57 (e.g., CD-ROM drive), display adapter 59, sound card 61, speakers 63, and network interface 65. Other computer systems suitable for use with the invention may include additional or fewer subsystems (see, e.g., FIG. 2B). For example, another computer system could include more than one processor 51 (i.e., a multi-processor system), or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2A is but an example of a computer system suitable for use with the invention. Other computer architectures having different configurations of subsystems may also be utilized.

Figure 2B:
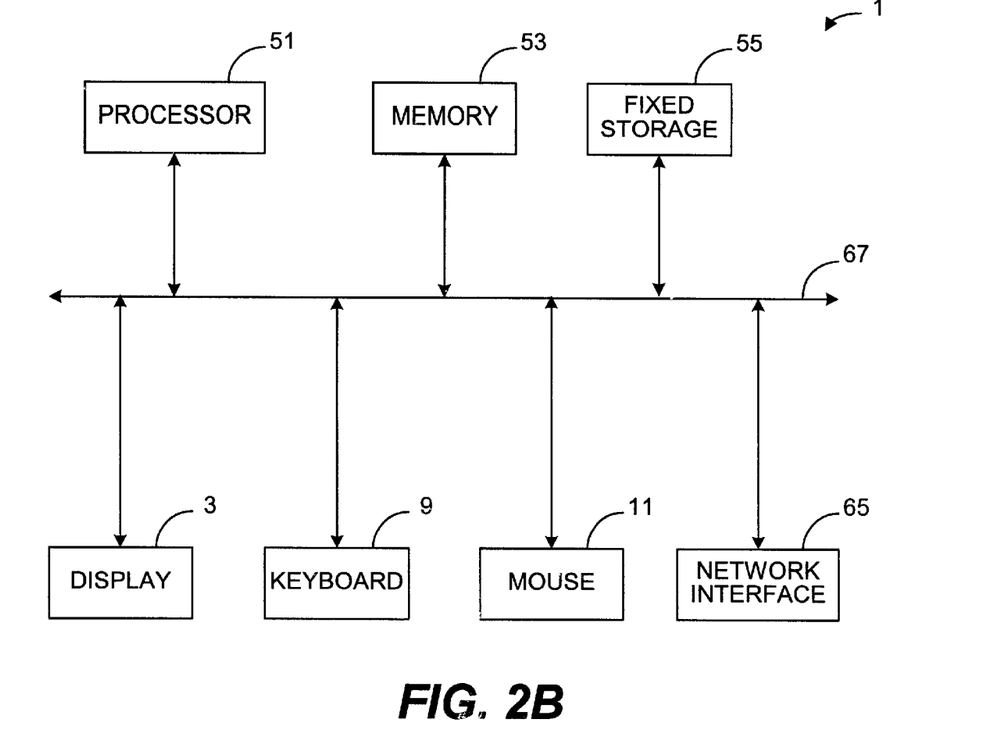
FIG. 2B shows a system block diagram of a computer system with fewer subsystems.

FIG. 2B shows a system block diagram of another computer system that has fewer subsystems that shown in FIG. 2A, which is an example of a network computer. Computer system 1 includes monitor 3, keyboard 9, mouse 11, central processor 51, system memory 53, and fixed storage 55. The central processor typically performs more of the processing so that the computer architecture may be simplified. The system memory may be RAM and the fixed storage may be ROM. As shown, the computer system does not include non-volatile memory for writing. Accordingly, computer system 1 includes network interface 65 that may be utilized to connect the computer system to another computer system (e.g., to a server for persistent storage).

Figure 3:
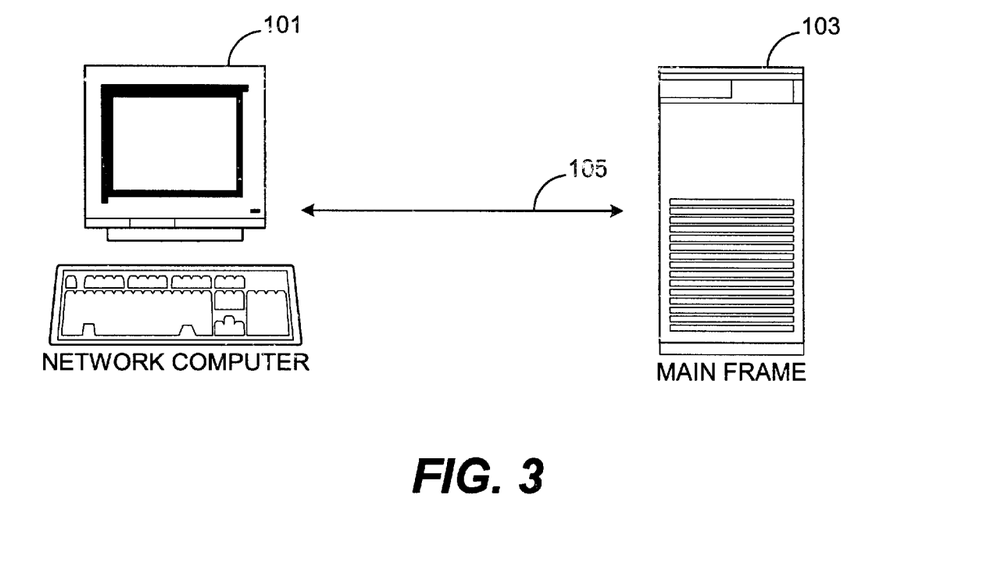
FIG. 3 shows a network diagram of a network computer connected to a main frame computer over a network.

FIG. 3 shows a network diagram of a network computer connected to a main frame computer over a network. A network computer 101 processes many, if not most, of the requests of the software applications executing on the network computer. For those requests that should be fulfilled by a server, a main frame computer 103 fulfills the requests. For example, requests to store or retrieve persistent data may be fulfilled by the main frame computer, which is connected to the network computer over a network 105. The network may be any network configuration including the Internet.

Figure 4:
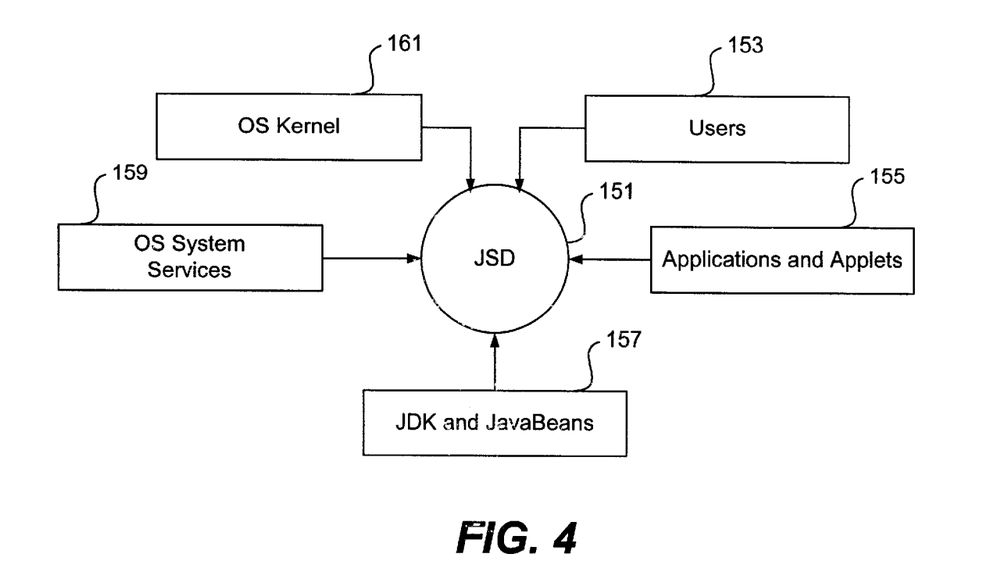
FIG. 4 shows a Java System Database and examples of the information that may be stored in the system database.

In preferred embodiments, the invention is utilized in a client/server environment that utilizes the Java System Database ("JSD"). The JSD is a system database that stores operating system ("OS") services, application and user information, JavaBeans, and Java Developer Kit ("JDK") components. FIG. 4 shows a Java System Database and examples of the information that may be stored in the system database. A JSD 151 stores information from users 153, information from applications and applets 155, JDK and JavaBeans 157, OS system services 159, and OS kernel information 161. By storing this information, the JSD may act as a central repository for this information. The invention may be advantageously applied to other system databases.

Persistent Managers

The Java System Database is a collection of named database objects. Naming an object is defined as the process of associating a name (or string) with a database entry object. A path name, which includes names separated by path name component-separator characters (e.g., "/"), uniquely identifies an entry in the database.

Entries can serve to represent such things as platforms, files, applications, users, or devices. Inserting an entry "publishes" and "advertises" its existence to other software components. An entry can also have properties, which are name string and Java object value pairs. The JSD provides a standard properties interface used to create, read, or delete properties associated with any entry in the database.

Figure 5:
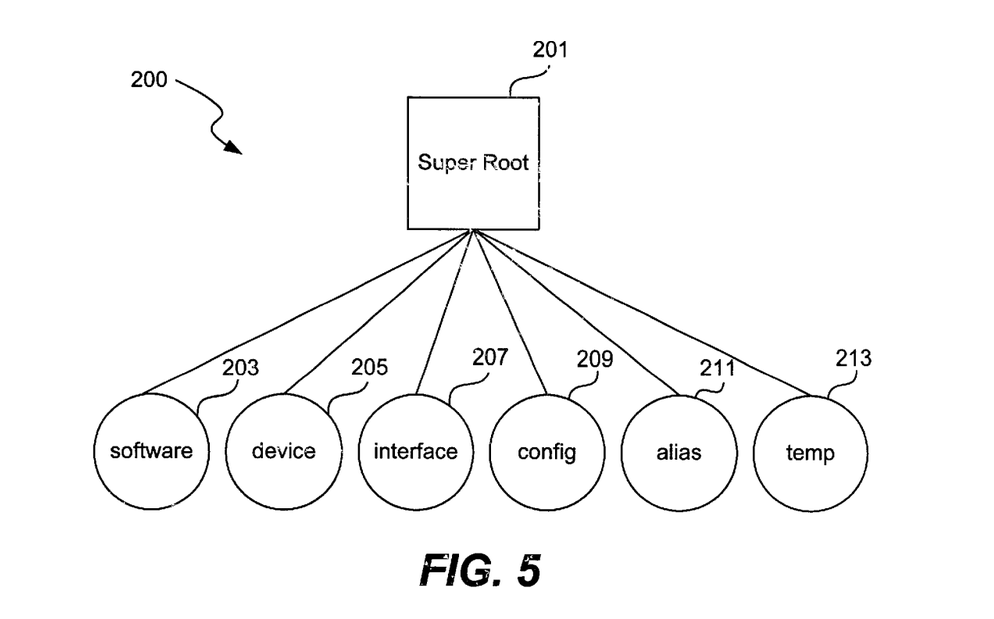
FIG. 5 shows a hierarchy of entries of a system database.

The database is organized as a hierarchy of entries. FIG. 5 shows a hierarchy of entries of the JSD. A database hierarchy 200 includes a super root 201, which is created and initialized during bootup. The super root's name is "/". Each entry in the hierarchy may act as both a single entry and the root of a tree of descendent entries. Each entry in the tree has a single parent and may have an unlimited number of child entries. All entries include links to their parent and children entries.

Below super root 201, the database hierarchy is further subdivided into namespaces, namely software 203, device 205, interface 207, config 209, alias 211, and temp 213. A namespace is a specifically designated tree of entries that names objects of like kind, such as software or devices. Namespaces are typically direct descendants of the super root. A number of namespaces are created during bootup. The following will discuss each of the namespaces shown in FIG. 5.

Software namespace 203 includes a list of installed and/or available system services such as device drivers, applications, and user configuration information. As will described in more detail below, some of the information in the software namespace may be downloaded from one or more server subsystems during bootup and user log in. Device namespace 205 includes a set of devices discovered at bootup on the local platform (or client). The device namespace may represent the hardware connectivity by having buses as parents and devices on the buses as children entries.

Interface namespace 207 includes a cross-reference of objects by type in other namespaces (e.g., device or software). For example, if a device driver specifies a device, a cross-reference entry may be inserted in the interface namespace. Config namespace 209 may be utilized to maintain client, user and application configuration information. In preferred embodiments, the config namespace is only utilized on the server subsystem.

Entries in alias namespace 211 typically refer to entries in interface namespace 207 and provide a simple, well known, logical naming scheme for some system devices. For example, a common alias in the alias namespace is /alias/system/DefaultPrinter, which could refer to the entry /interface/device/printer/hplnkJet#1. Temp namespace 213 is available as temporary storage. Applications can make use of this temporary storage facility.

A primary goal of the JSD server is to extend the JSD by defining a framework to implement entries that can be saved and retrieved from permanent or persistent storage. The term "persistent" is used to indicate that an entry and all its properties are made non-volatile, as opposed to "transient" entries that are lost if the computer system shuts down or crashes. The manager associated with the persistent entry is responsible for implementing mechanisms to make an entry persistent. Persistence can take a multitude of forms, including permanent disk storage, a remote connection to a database server, or a gateway connection to an external directory service.

Persistent entries enable the JSD to save client entry state information to permanent storage. A client entry value can be stored on persistent storage by the server for later retrieval. For instance, device and user information that cannot be discovered during system startup may need to be stored in a persistent storage to be accessed when the system is restarted. Additionally, persistent entries allow an entry stored on the server to be shared among multiple clients. Two different clients can share the same set of entries.

Figure 6:
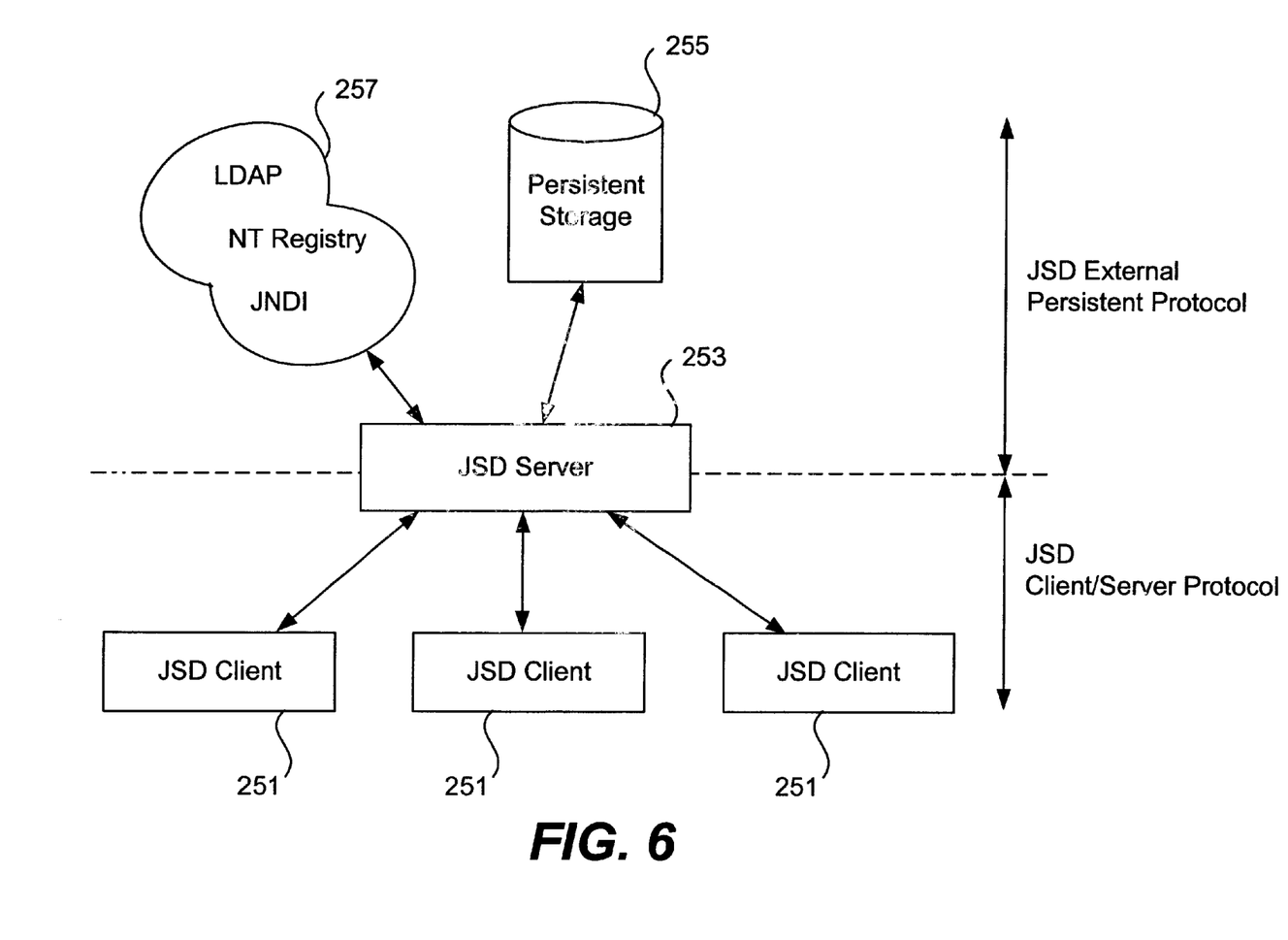
FIG. 6 shows multiple client subsystems sharing persistent entries through a server subsystem.

FIG. 6 shows multiple client subsystems sharing persistent entries through a server subsystem. JSD clients 251 communicate with a JSD server 253 utilizing a client/server protocol. The communication includes storage and retrieval of persistent entries. JSD server 253 interfaces with a persistent storage 255 through a persistent protocol. Additionally or alternatively, the JSD server may interface with an external directory service 257, such as LDAP, DNS or NIS, for persistent storage. Persistent entries may also be utilized to maintain a journal log of client entry updates. A system administrator can use the journal log to monitor changes in user environment setups.

As mentioned earlier, JSD entries are divided into two types: transient and persistent entries. Transient entries are volatile entries that are lost whenever the JSD or the network computer is shutdown or crashes. Transient entries are typically entries that are dynamically reconstructed whenever the network computer is restarted. For example, device configuration entries are constructed at startup time by the startup boot procedure when physical devices are discovered. There is no need to permanently store this information, as the OS needs to verify that physical devices are present during system startup.

On the other hand, persistent entries are entries that should be saved on a persistent storage location. Configuration information related to user environments is a good example of information that may be stored on persistent storage. When a user logs on, her last saved environment may be retrieved so she does not have to reset the environment. Accordingly, persistent entries are entries that can be saved and retrieved from a permanent storage location. In preferred embodiments, a persistent entry can only be inserted under a persistent entry and a transient entry can only be inserted under a transient entry. The super root entry of the JSD is a special entry, and the only entry that can have both transient and persistent children. The transient and persistent namespaces are statically separated when namespaces are created.

When an entry namespace is created, the namespace is initialized with a transient or persistent attribute depending on the type of the namespace root entry. In most instances, a platform such as a network computer will not have local access to a writable non-volatile storage device such as a disk drive. The client will have to interact with a remote server to implement persistency. However, the JSD server model does not preclude a persistent entry from being stored on the client when the client has permanent storage. In this particular case, the server is co-located with the client.

Figure 7:
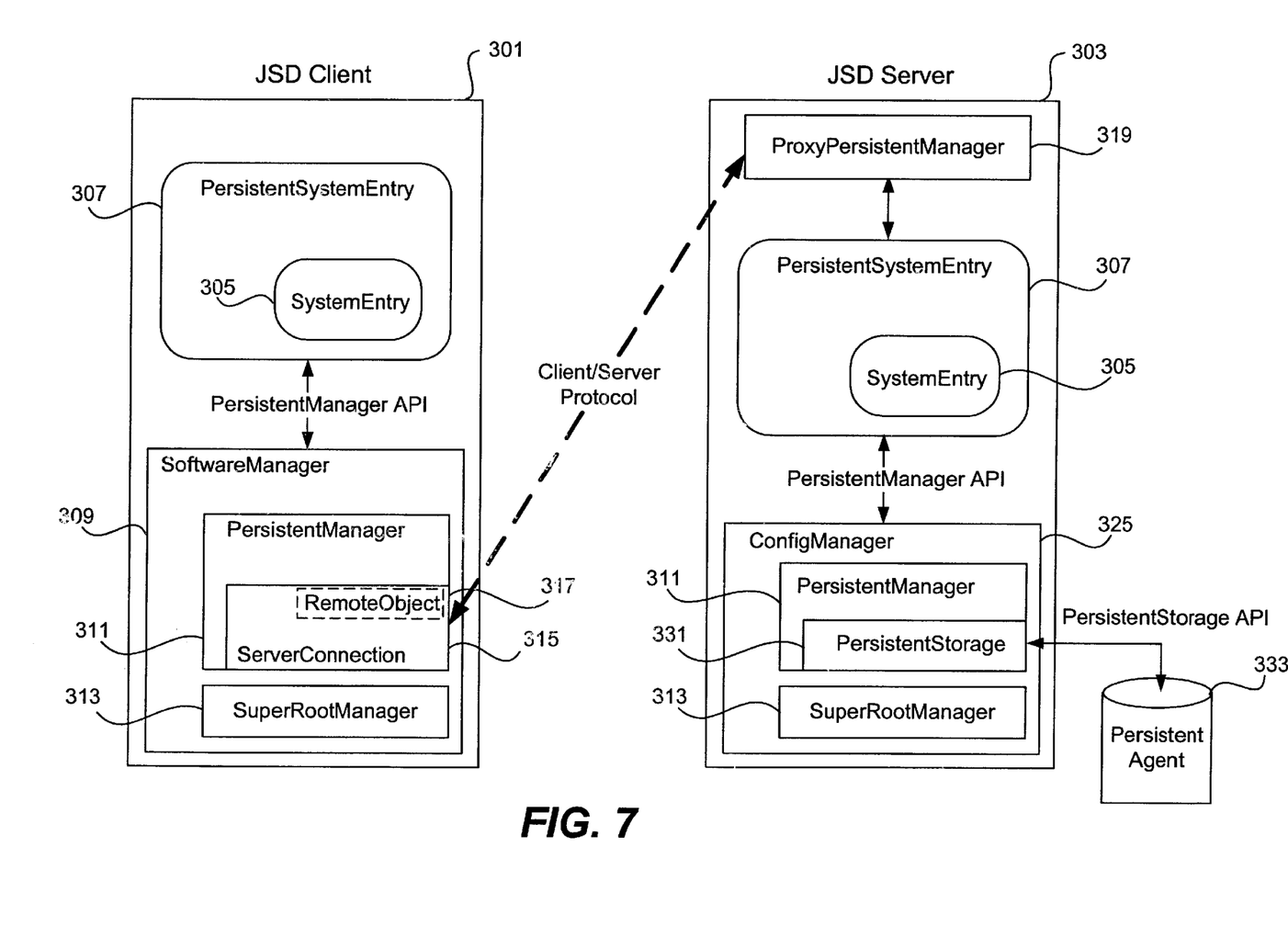
FIG. 7 shows a client/server environment with respect to persistent entries.

FIG. 7 shows the JSD client/server environment with respect to persistent entries. A JSD client 301 communicates with a JSD server 303 through a client/server protocol. A class SystemEntry 305 defines classes of system entries in the JSD. A subclass of SystemEntry 305 is subclass PersistentSystemEntry 307, which defines persistent entries. There is a PersistentManager class that defines persistent managers for persistent entries. In general, the persistent manager serializes the persistent entries into a binary representation so that they may be transferred between the client and server subsystems. Additionally, each namespace has a manager for entries in the namespace.

On the client subsystem, the software namespace is persistent and includes information specific to a hardware platform as well as the user currently logged in. The SoftwareManager is the persistent manager on the client that manages persistent entries in the software namespace. On the server subsystem, the config namespace is persistent and includes client, user and application configuration information. The ConfigManager is the persistent manager on the server that manages persistent entries in the config namespace. Both the SoftwareManager and ConfigManager are instances of the class PersistentManager.

In preferred embodiments, when a persistent entry is updated on the client or server subsystem, the persistent manager on the subsystem where the change occurred notifies the persistent manager on the other subsystem. In this manner, the persistent entries on both the client and server may remain consistent.

Returning to FIG. 7, a SoftwareManager 309 is on the JSD client. SoftwareManager 309 inherits from a Peristent- Manager class 311 and a SuperRootManager class 313. From the PersistentManager class, the SoftwareManager has an instance of a ServerConnection class 315 to activate and manage a connection with the JSD server. The ServerConnection object communicates to the server via a RemoteObject reference 317. The reference is created when the server connection is established. In one embodiment, the protocol utilized by the ServerConnection object is the Internet inter-ORB protocol ("IIOP").

JSD server 303 includes a proxy PersistentManager 319 that communicates with the ServerConnection object of the client. As on the client, a class SystemEntry 305 defines classes of system entries in the JSD. A subclass of SystemEntry 305 is subclass PersistentSystemEntry 307, which defines persistent entries. A ConfigManager 325 inherits from PeristentManager class 311 and a SuperRootManager class 313. From the PersistentManager class, the SoftwareManager has an instance of a PersistentStorage class 331 to store and retrieve persistent entries on a persistent agent 333. The PersistentStorage object communicates with the persistent agent via a persistent storage application programming interface ("API"). Persistent agent 333 may be include a permanent disk storage, a remote connection to a database server, or a gateway connection to an external directory service.

When a client application changes an entry in the software namespace, the changes are propagated to the user specific area on the server. On the server side, persistent system entries are managed by the ConfigManager. The config namespace is the only namespace existing on the server and the ConfigManager provides backing store for entries within its namespace. The ConfigManager interacts with the persistent disk storage via the PersistentStorage object. The PersistentStorage object forwards entry changes to the permanent storage.

Requests to store or retrieve persistent entries are passed from SoftwareManager 309 on the client to ConfigManager 325 on the server, which fulfills the requests. Although the client and server subsystems are typically on different computer systems, they may reside on the same computer system. For example, if a network computer includes or is connected to a hard drive, the server may reside on the same network computer and fulfill persistent storage requests.

Figure 8:
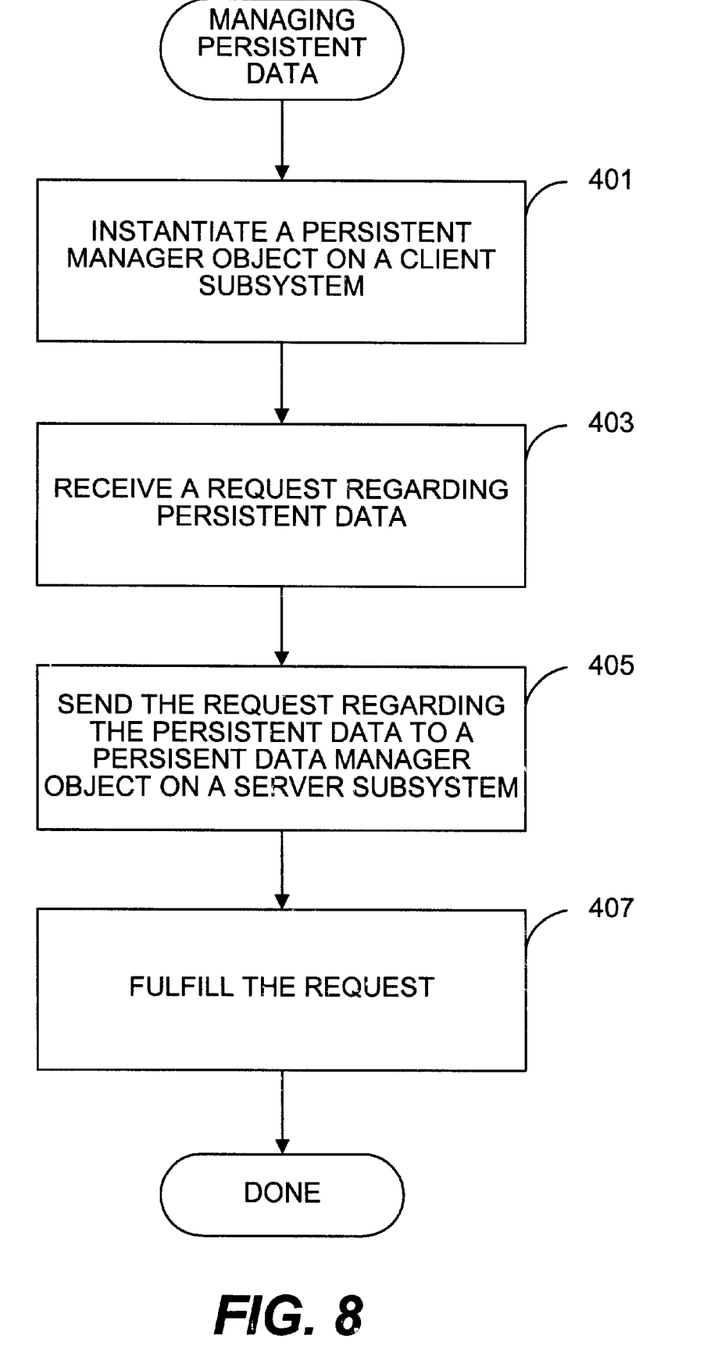
FIG. 8 illustrates a flowchart of a process of managing persistent data or entries.

FIG. 8 illustrates a flowchart of a process of managing persistent data or entries. At a step 401, a persistent manager object is instantiated on a client subsystem. For example, the persistent manager object may be SoftwareManager as described above. The persistent manager object on the client subsystem receives a request regarding persistent data at a step 403. The request may be to store, retrieve or delete persistent data, which may be system entries.

At a step 405, the persistent manager object on the client subsystem sends the request regarding the persistent data to a persistent manager object on the server subsystem. The persistent manager object on the server may be ConfigManager as described above. Once the persistent manager object on the server receives the request, it fulfills the request at a step 407. Depending on the request, the persistent manager object on the server may need to send a response back to the client.

Figure 9:
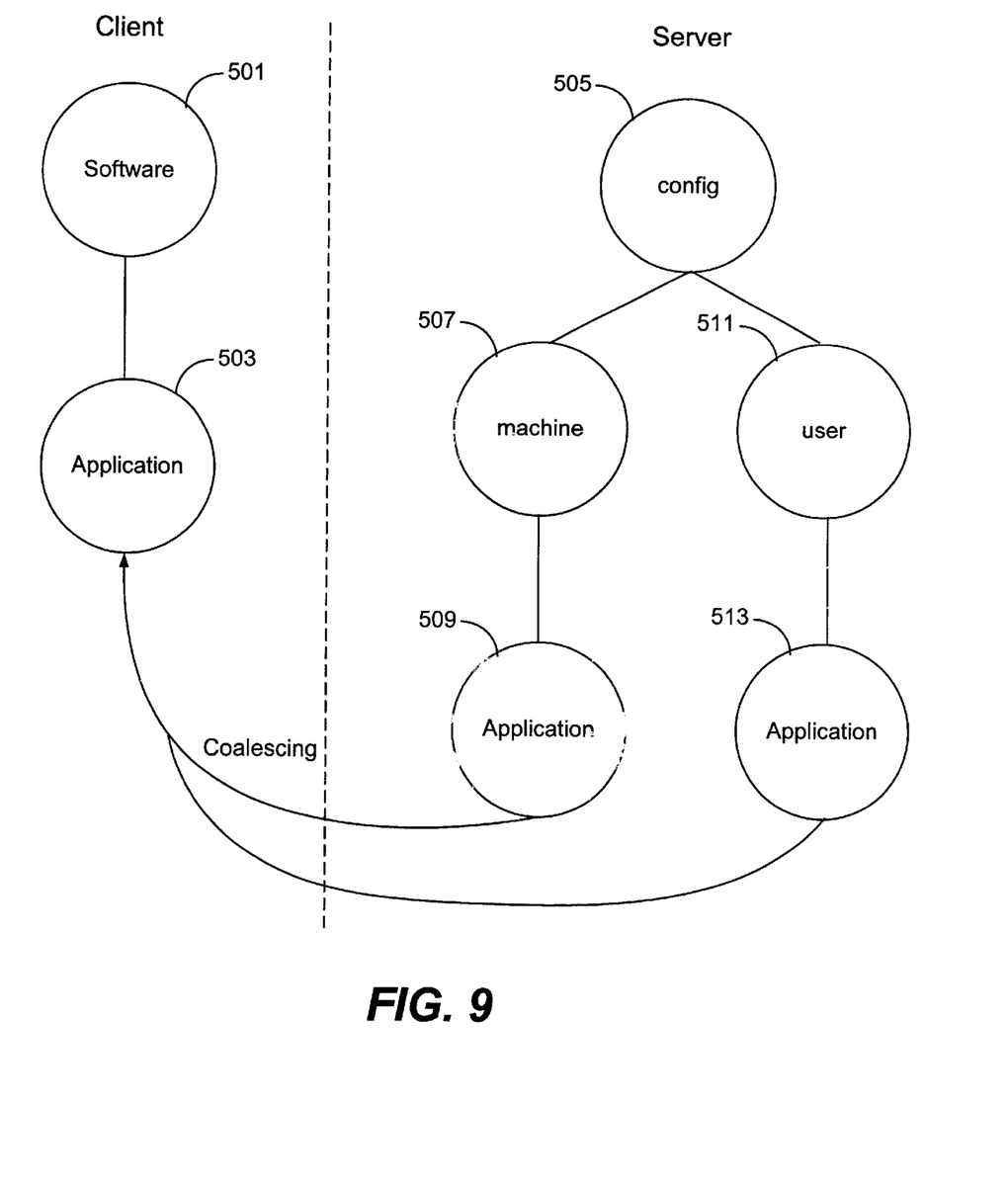

Persistent entries may also be utilized during network computer bootup and user log in. The persistent entries may be coalesced or combined with other entries that are persistent or transient. FIG. 9 shows a hierarchy of entries that are coalesced during bootup or user log in. For simplicity, only the persistent namespaces are shown. On the client side, a software namespace 501 includes sub-entries in application 503 for configuration information of specific applications.

On the server side, a config namespace 505 includes sub-entries under machine 507 and application 509 for the hardware platform of the client subsystem. The config namespace includes sub-entries under user 511 and application 513 for information about the user that was last logged in. The server maintains the persistent entries for use by the client.

During bootup, firmware entries that have been copied in the ROM file system are used to initialize the boot-time JSD entries. Once a connection to the server is established (e.g., the Java OS TCP/IP stack is up), the SoftwareManager on the client subsystem contacts the server subsystem requesting machine configuration information (e.g., the hardware platform sub-entries). At this point, a RemoteObject is instantiated and a ServerConnection object is returned that references the machine level entries. As shown, the machine level entries are coalesced with the existing data from the ROM file system to populate the client.

Additionally, when a user logs on, a new ServerConnection object is instantiated that references the user level entries (e.g., the user information sub-entries). The user level entries are then coalesced with the machine entries to populate the client. In preferred embodiments, the entries are coalesced on the client side. ServerConnection objects register listener JSD events for parts of the tree they are concerned with. This allows ServerConnection objects to be notified when a part of the JSD used to populate the client has been changed on the server. The server is also using callback routines to update client entries in a two-server configuration. Updates from one server may need to be coalesced with the second server entries on the client.

The ConfigManager may provide a special insert method that does not involve the persistent agent. This method is used to initially populate the server tree. Since entries have just been retrieved from persistent storage, there is no need to back them up.

The JSD client/server architecture is generic and does not impose any restrictions on the physical location of the server. The architecture supports a variety of configurations where the server can be co-located with the client or the server can be on a remote system. For example, the client and server may be located on the same machine (e.g., mobile network computers), client and a remote server with both user and machine configuration, and client and two remote servers (one server for booting machine configuration, one server for booting user configuration).

Figure 10:
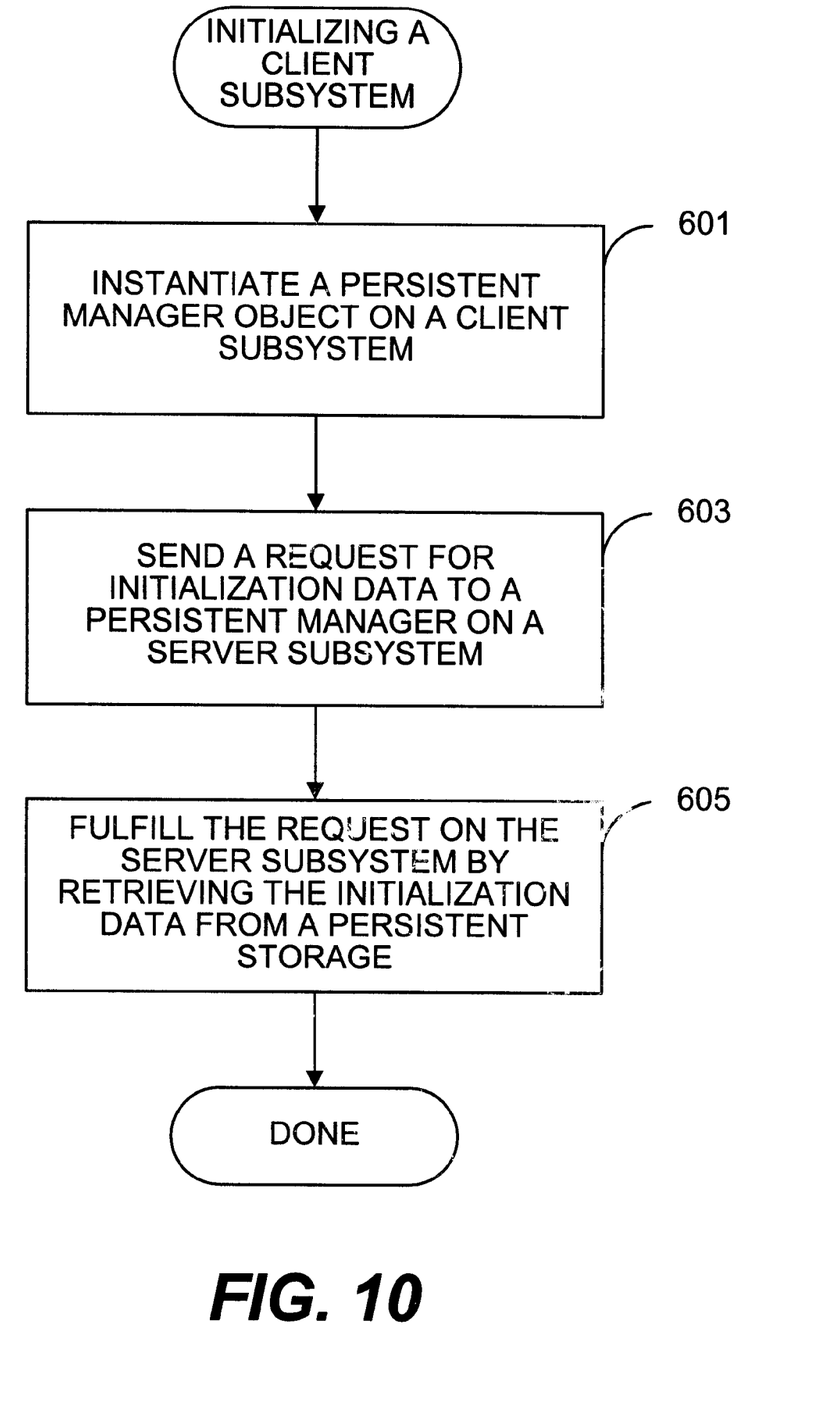
FIG. 10 illustrates a flowchart of a process of initializing a client subsystem.

FIG. 10 illustrates a flowchart of a process of initializing a client subsystem. At a step 601, a persistent manager object is instantiated on a client subsystem. For example, the persistent manager object may be SoftwareManager as described above. The persistent manager object on the client subsystem sends a request for initialization data to a persistent manager object on a server subsystem at a step 603. The persistent manager object on the server may be ConfigManager as described above. The initialization data is typically configuration data, which may include information on the hardware of the client subsystem or information on a user of the client subsystem, typically the last user.

At a step 605, the persistent manager object on the server subsystem fulfills the request by retrieving the initialization data from a persistent storage. The retrieved initialization data may be sent to the persistent manager on the client subsystem. Additionally, the initialization data may be coalesced with initialization data that is stored, typically transiently, on the client subsystem.

In preferred embodiments, initialization data for bootup (e.g., hardware information) is obtained from the server subsystem and coalesced with initialization data on the client subsystem. Subsequently, initialization data for log in (e.g., user information) is obtained from the server subsystem and coalesced with initialization data on the client subsystem.

CONCLUSION

While the above is a complete description of preferred embodiments of the invention, various alternatives, modifications, and equivalents may be used. It should be evident that the invention is equally applicable by making appropriate modifications to the embodiments described above. For example, the embodiments described have been in reference to a Java OS, but the principles of the present invention may be readily applied to other systems and languages. Therefore, the above description should not be taken as limiting the scope of the invention that is defined by the metes and bounds of the appended claims along with their full scope of equivalents.

What is claimed is:

1. A method for initializing a client subsystem comprising:
   instantiating a first persistent manager object on a client subsystem, the first persistent manager object being an instance of a persistent manager class;
   the first persistent manager object on the client subsystem sending a request for initialization data to a second persistent manager object on a server subsystem, the second persistent manager object being an instance of the persistent manager class;
   the second persistent manager object fulfilling the request on the server subsystem by retrieving the initialization data from a persistent storage; and
   coalescing, on the client subsystem, the initialization data stored on the client subsystem with the initialization data from the persistent storage.

2. The method of claim 1, wherein the initialization data from the persistent storage includes information on hardware of the client subsystem.

3. The method of claim 2, wherein the information on the hardware of the client subsystem is retrieved at bootup.

4. The method of claim 1, wherein the initialization data from the persistent storage includes information on a user of the client subsystem.

5. The method of claim 4, wherein the information on the user of the client subsystem is retrieved when the user logs on.

6. The method of claim 1, wherein the second persistent manager object fulfilling the request includes sending the retrieved initialization data from the persistent storage to the first persistent manager object.

7. A method for managing persistent data in a client/server environment having a client Java system database (JSD) and a server JSD in a system-wide JSD, comprising:
   instantiating a first persistent manager object on the client JSD for managing persistent entries on the client JSD, the first persistent manager object being an instance of a persistent manager class in the system-wide JSD thereby enabling saving client entry state information in permanent storage;
   the first persistent manager object on the client JSD receiving a request regarding persistent data contained in the system JSD;
   first persistent manager object sending the request to a second persistent manager object on the server JSD, the second persistent manager object being an instance of the persistent manager class; and
   the second persistent manager object fulfilling the request on the server JSD.

8. The method of claim 7, wherein the request is to store the persistent data.

9. The method of claim 8, wherein the second persistent manager object fulfills the request by storing the persistent data in a persistent storage.

10. The method of claim 1, wherein the request is to retrieve the persistent data.

11. The method of claim 10, wherein the second persistent manager object fulfills the request by retrieving the persistent data from a persistent storage and sending the persistent data to the first persistent manager object.

12. The method of claim 7, further comprising instantiating the second persistent manager object on the server JSD.

13. The method of claim 7, wherein the first and second persistent manager objects serialize persistent data into a binary representation so that the persistent data may be transferred between the client JSD and the server JSD.

14. The method of claim 7, wherein the first and second persistent manager objects notify the other if there is a change to the persistent data.

15. The method of claim 7, wherein the client JSD does not have non-volatile storage for writing.

16. A computer program product for managing persistent data in a client/server environment having a client Java system database (JSD) and a server JSD in a system-wide JSD, comprising:
   computer code that instantiated a first persistent manager object on the client JSD for managing persistent entries on the client JSD, the first persistent manager object being an instance of a persistent manager class;
   computer code of the first persistent manager object on the client JSD that receives a request regarding persistent data contained in the system JSD;
   computer code of the first persistent manager object that sends the request to a second persistent manager object on the server JSD, the second persistent manager object being an instance of the persistent manager class; and
   a computer readable medium that stores the computer codes.

17. The computer product of claim 16, wherein the computer readable medium is selected from the group consisting of CD-ROM, floppy disk, tape, flash memory, system memory, hard drive, and data signal embodied in a carrier wave.

18. A computer program product for initializing a client subsystem, comprising:
   computer code that instantiates a first persistent manager object on a client subsystem, the first persistent manager object being an instance of a persistent manager class;
   computer code of the first persistent manager object on the client subsystem that sends a request for initialization data to a second persistent manager object on a server subsystem, the second persistent manager object being an instance of the persistent manager class;

computer code of the first persistent manager object that receives the initialization data from the second persistent manager object;

computer code that coalesces, on the client subsystem, initialization data stored on the client subsystem with the received initialization data from the second persistent manager object; and a computer readable medium that stores the computer codes.

19. The computer program of claim 18, wherein the computer readable medium is selected from the group consisting of CD-ROM, floppy disk, tape, flash memory, system memory, hard drive, and data signal embodied in a carrier wave.

* * * * *